United States Patent Office 3,413,278
Patented Nov. 26, 1968

3,413,278
PROCESS FOR THE PRODUCTION OF TELOMERS OF ETHYLENE WITH AMINES AND PRODUCTS
Erwin Weinrich, Dusseldorf, and Manfred Budnowski, Dusseldorf-Holthausen, Germany, assignors to Henkel & Cie. G.m.b.H., Dusseldorf-Holthausen, Germany, a corporation of Germany
No Drawing. Filed Aug. 5, 1964, Ser. No. 387,774
Claims priority, application Germany, Aug. 30, 1963, H 50,144
6 Claims. (Cl. 260—94.9)

ABSTRACT OF THE DISCLOSURE

This invention relates to a process for the preparation of telomers of ethylene with amines which comprises subjecting ethylene to free-radical polymerization conditions in the presence of free-radical polymerization catalysts which do not decompose at room temperature, in the presence of an amine containing only nitrogen, carbon and hydrogen, having at elast one

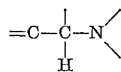

group whose carbon atom alpha to the amino group has at least one hydrogen atom, said amine being free of acetylenic bonds and olefinic unsaturation and having from two to twenty carbon atoms, at an ethylene pressure of at least 30 atmospheres, and recovering said telomers. The invention also relates to the predominately solid telomers produced which are similar to emulsifiable polyethylenes.

---

It is known to prepare modified polyethylene by polymerization of ethylene in the presence of various compounds having functional groups. Examples of such compounds having functional groups are halogenated hydrocarbons, alcohols, ketones, ethers and esters. In this special embodiment of polymerization, which is designated as telomerization, the compounds having functional groups are built into the corresponding polymerizate and impart certain properties thereto.

It is further known that α-olefins may be added to amines with the aid of free radicals. α-Alkylated amines are essentially obtained thereby, in which the amine-olefin ratio is 1:1. Telomers are formed only as side products, especially when long chain olefins are used; by telomers we mean those adducts which comprise more than one mol of olefin per mol of amine. Upon addition of ethylene to amine only 1:1-adducts have heretofore been isolated.

An object of the present invention is the development of a process for the preparation of telomers of ethylene with amines which comprises free-radical polymerization of ethylene in the presence of an amine having at least one hydrogen on the carbon atoms alpha to the amino group at an ethylene pressure of at least 30 atmospheres and recovering said telomers.

A further object of the invention is the development of a process for the preparation of predominately solid telomers of ethylene with amines which comprises reacting at least 5 mols of ethylene with one mol of an amine having at least one hydrogen on the carbon atoms alpha to the amino group in the presence of a free-radical polymerization catalyst at temperatures of from about 50° C. to about 300° C. at an ethylene pressure of at least 150 atmospheres, and recovering said predominately solid telomers.

A still further object of the invention is the development of a process for the preparation of predominately distillable liquid telomers of ethylene with amines which comprises mixing less than 5 mols of ethylene with one mol of an amine having at least one hydrogen on the carbon atoms alpha to the amino group, heating the mixture to a temperature of from about 50° C. to about 300° C. at an ethylene pressure of from 30 atmospheres to 300 atmospheres, adding sufficient free-radical polymerization catalyst to effect polymerization to said heated mixture, cooling and recovering said predominately distillable liquid telomers.

A yet further object of the invention is the obtention of novel amine-containing telomers by the process of the invention.

These and other objects of the invention will become better apparent as the description thereof proceeds.

We have now discovered a process for telomerization of ethylene which leads to technically useful products and is characterized in that free radicals are formed, in known fashion, in a mixture of ethylene and amine, wherein the ethylene pressure is at least 30 atmospheres, but especially at least 70 atmospheres.

Primary, secondary and tertiary amines having alkyl or cycloalkyl groups attached to the nitrogen may be used as starting materials for the telomerization of ethylene according to the present invention. The alkyl or cycloalkyl carbon atom in α-position with respect to the nitrogen atom of said amines must have at least one hydrogen atom attached thereto. Preferentially the alkyl radicals are lower alkyl having at least two carbon atoms, however, higher alkyl amines having up to 20 carbon atoms may be employed.

Examples of amines which may be used are the following: ethylamine, diethylamine, triethylamine, isopropylamine, diisopropylamine, butylamine, dibutylamine, tributylamine, isobutylamine, diisobutylamine, as well as the isomeric hexyl-, heptyl-, octyl-, nonyl-, decyl- and dodecylamines and the like. Further suitable amines are cycloalkyl amines and heterocyclic compounds of nitrogen whose rings are saturated, such as cyclohexylamine, piperidine, N-methyl-piperidine, dicyclohexylamine, pyrrolidine as well as their alkyl substitution products.

Other substituents, such as phenyl radicals, may also be attached to the alkyl radical. For instance, benzylamine and α-phenyl-ethylamine are useful for the reaction according to the present invention. It is further possible to use also those amines for the reaction according to the present invention which contain more than one amino group in the molecule, such as ethylenediamine, propylenediamine, diethylenetriamine and the like. Of course, mixtures of amines may also be used as starting materials. The above may be designated as amines containing only nitrogen, carbon and hydrogen, having at least one

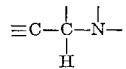

group whose carbon atom alpha to the amino group has at least one hydrogen atom, said amine having from two to twenty carbon atoms.

Generally known free-radical formers or free-radical polymerization catalysts, such as peroxides, may be used as initiators for the telomerization according to the present invention. It is advantageous to select those radical-forming peroxides which, for practical purposes, do not decompose at room temperature. Examples of suitable peroxides are dialkylperoxides, such as di-tert.-butyl-peroxide, or also alkylhydroperoxides, such as tert.-butyl-hydroperoxide. Other free radical-formers, such as azo-diisobutyric acid nitrile, may also be used.

The reaction according to the present invention is performed at an ethylene pressure of at least 30 atmospheres, preferably at least 70 atmospheres. For the preparation of predominantly liquid products the indicated lower limit of pressure is sufficient. However, if predominantly solid products are to be produced, acceptable yields are obtained at a pressure above about 150 atmospheres. The upper limit of the pressure is essentially that of the strength of the apparatus wherein the reaction is performed. In general, the reaction is carried out at a pressure of up to about 2000 atmospheres, especially up to 1000 atmospheres. The applied pressure has an effect upon the yield of higher molecular weight telomers, which becomes greater with increasing pressure.

The temperature at which the reaction according to the invention is performed lies advantageously between about 50 and 300° C., depending primarily on the temperature at which the free-radical polymerization catalysts decompose.

In general, no solvents are used. As a rule, small amounts of inert solvents, for instance, water or hydrocarbons, such as benzene and gasoline, do not interfere. In some instances purer products are obtained by addition of suitable solvents.

The properties of the products obtained by the reaction according to the present invention depend upon the amines used as starting materials, upon the molar ratio of amine to ethylene in the reaction mixture and upon the free radicals formed per mol in a given unit of time. Of primary importance is the last-mentioned, the free-radical concentration over the period of the telomerization which, as is well known, depends upon the rate of decomposition of the free-radical formers. The decomposition rate in turn is a value which varies in accordance with an exponential function of the temperature.

The majority of the products which may be produced by the process according to the present invention and are liquid to solid at room temperature are novel chemical compounds. This applies to the solid high-molecular-weight products, which may be considered as polyethylene containing amino groups, as well as to the liquid products having a lower molecular weight, which may be considered to be a mixture of alkyl-substituted amines.

The nitrogen content of the products decreases in going from the liquid to the solid products. The solid polyethylenes having free amino groups have a nitrogen content of about 0.5 to 0.2%.

For the preparation of telomerizates with a solid or wax-like consistency at room temperature, approximately the following conditions should be maintained. The lower limit of the molar ratio of amine to ethylene is about 1:5. Most advantageously, the molar ratio of amine to ethylene is between about 1:7 and 1:500, and preferably between 1:10 and 1:50. Moreover, an excessive quantity of free-radicals per mol of amine must not be formed in a given unit of time. In general, the amount and concentration of free-radical formers are of an order of magnitude which is customary for polymerization reactions. Slow increase in temperature of the reaction mixture or slow continuous addition of small amounts of the free-radical former, preferably at a temperature at which the decomposition rate of the free-radical former is still low, provide assurance for a relatively low concentration of free-radicals at any given time. Pursuant to an embodiment which is practical for smaller batches, about 30 to 1 millimols, preferably 20 to 10 millimols, of free-radical former per mol of amine are used, and the reaction mixture is heated slowly in an electrically heated autoclave. At the upper limit of the above-indicated free-radical polymerization catalyst concentration, the quantity of wax-like products formed by the reaction increases, especially when the reaction mixture is heated relatively rapidly. Predominantly solid products are formed at the lower limit.

When only very few free radicals are formed, the yield of reaction product decreases. For instance, if the amount of free-radical former drops below about 10 millimols per mol of amines, the yield decreases but the nitrogen content of the reaction product does not decrease. This means that the average molecular weight of the reaction products does not change materially below this concentration of 10 millimols per mol of amine.

Also, when the amount of amine is reduced below the above-indicated limit, that is, if the reaction is carried out with a ratio of amine to ethylene above 1:50, the yield decreases but not the nitrogen content of the products formed thereby.

The solid, nitrogen-containing polyethylene produced in accordance with the present invention has a molecular weight between about 1000 and 6000. It has a penetration of about 1 to 25 penetration degrees under standard conditions and may technically advantageously be used as an emulsifiable polyethylene. Especially useful are products with a molecular weight in the range of 2000 and 4000.

For the preparation of telomers which are predominantly liquid to wax-like at room temperature, whose liquid components may be separated by distillation in vacuo, if desired, other reaction conditions must be selected. In this case the ratio of amine to ethylene is between about 1:1 and 1:5, although an excess of amine to ethylene may be used. The excess amine behaves like a solvent. It may be recovered after the reaction.

The number of free radicals formed per unit of time is again of particular importance for the formation of products which are liquid to wax-like at room temperature. On the one had, as indicated above, if the decomposition is slow, predominantly solid reaction products are formed from an amount of about 10 millimols of free-radical former per mol of amine; on the other hand, however, if the decomposition is rapid, substantial amounts of liquid products are formed, which may be distilled in a high vacuum. Decisive for the formation of the latter is that a relatively high concentration of free radicals is produced per given unit of time and per mol of amine. This may be achieved by various methods. For instance, the free-radical former may be injected into the mixture of amine and ethylene at a temperature at which the free-radial former decomposes practically instantly. For this purpose the free-radical former is advantageously dissolved in additional amine.

In the event that the free radicals formed in the reaction mixture are produced from known chemical compounds which decompose thermally into free radicals, the quantity formed per unit of time depends upon the temperature. Since relatively stable free-radical formers are generally used, higher temperatures can be used for the preparation of predominantly liquid products than for the preparation of solid products. Therefore, prior to the addition of free-radical formers, the mixture of amine and ethylene should be heated to temperatures of about 120 to 300° C., especially 150° to 200° C., depending upon the thermal stability of the free-radical formers.

The proper conditions for the preparation of certain definite types of reaction products may readily be determined by a few preliminary tests. In addition to the above-mentioned factors, the shape, material and volume of the reaction space also have a minor influence upon the formation of certain types of products.

When the process according to the present invention is performed batchwise, an autoclave is preferably used. It is also possible to perform the reaction in continuous fashion by passing a mixture of amine and ethylene through heated tubes and injecting the initiator at one or several different places. If it is desired to produce predominantly solid, nitrogen-containing poly-ethylene, relatively small amounts of free-radical polymerization catalysts should be used, and the reaction should be performed at temperatures such that the free-radical former decomposes only gradually. If it is preferred to produce liquid products, the mixture consisting of amine, ethylene and initiator may be caused to react by introducing it into a system of tubes heated to a relatively high temperature. The temperature should be so high that a very rapid decomposition of the free-radical former takes place. In these cases it is sometimes advisable to inject additional free-radical formers at further places in the system.

The effect of varying concentration of free-radical formers in one unit of time is illustrated with the aid of the Examples I and VII. In Example I the reaction mixture, including the catalyst, was heated in an autoclave from a temperature of 100° C. to 200° C. over a period of two hours. Calculated on the basis of 1 mol of amine, 14.4 millimols of di-tert.-butyl peroxide were present. In Example VII, 12.3 millimols of di-tert.-butyl peroxide were used, calculated on the basis of 1 mol of the same amine, but it was injected in nine portions into the preheated (200° C.) reaction mixture over the period of about one hour. At this temperature, a practically instantaneous decomposition of the peroxide takes place. In both instances the pressure was of the same order of magnitude (300 and 270 atmospheres, respectively). In one instance, Example I, a predominantly solid polyethylene containing amino groups was obtained, while in the other instance, Example VII, a mixture of predominantly liquid amines with a maximum molecular weight of the non-distilled residue of about 300 to 500 was obtained.

The reaction mixture is worked up by well known methods depending upon the properties of the products which are formed.

In those cases where, due to the reaction conditions which were used, perdominantly solid products are obtained, a raw product is obtained after removing the excess ethylene; this raw product may be used directly for various purposes. When benzene has been used as a solvent, the polyethylene containing amino groups may be precipitated therefrom with the aid of a suitable solvent, such as methanol or ethanol, or it may be crystallized out by cooling, or the benzene may be distilled off.

Any undesirable side products which may possibly be present may be separated by dissolving the raw product in a solvent, such as an aromatic hydrocarbon, and precipitating the polyethylene containing amino groups with a suitable solvent, such as ethanol.

In the event that, because of the reaction conditions, predominantly liquid products have been formed, a fractional distillation, toward the end preferably under a high vacuum, may be applied after removal of the excess ethylene and possibly distilling off the excess amine. In some cases it is also advantageous to separate the principal product by salt formation from those substances which are not capable of forming salts, prior to further purification. This may be accomplished by acidifying the reaction mixture with a mineral acid and extracting the acidified mixture with a water-immiscible organic solvent, such as ether, chloroform, benzene, gasoline or the like. Subsequently, after adding an alkali such as an alkali metal hydroxide or carbonate, the amines are taken up in an organic solvent. After drying the solution over caustic soda, the amines may be recovered by fractional distillation.

With respect to their chemical structure, the reaction products have the common characteristic that they are amines with more or less long alkyl radicals attached thereto which, particularly in the case of the high-molecular-weight products, have preferably only tertiary carbon atoms adjacent to the nitrogen atom. The reaction products are mixtures of compounds of the probable formula

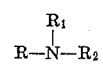

where R is

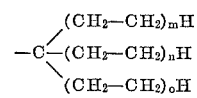

where $m$, $n$ and $o$ are whole numbers, and $R_1$ and $R_2$ are identical to R, or hydrogen, or members of a cycloaliphatic ring.

As an illustration of the types of compounds formed by the reaction according to the present invention, the following examples are given. When isopropylamine is used as the starting amine for the reaction to produce liquid telomers, distillation of the raw reaction mixture yields amines of the probable formula

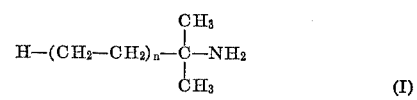

wherein $n$ is a whole number, for instance, from 1 to 9 (see Example VI).

Analogous but higher molecular-weight compounds are the non-distillable wax-like to solid reaction products which are obtained when a lower free-radical concentration per unit time is maintained. Under these circumstances $n$ in Formula I assumes values greater than 9, for instance, about 20 to 80.

When cyclohexylamine is used as the starting amine instead of isopropylamine (see Example IX), the reaction products are substances of the following probable formula:

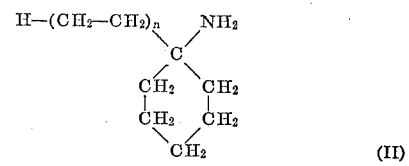

wherein $n$ is a whole number, for example, from 1 to 5, when the reaction to produce liquid telomers is employed.

Since isopropylamine and cyclohexylamine have only one reactive hydrogen atom attached to the carbon atom which is in α-position with respect to the nitrogen, the situation is simple compared to those cases where several hydrogen atoms on the α-carbon atom can enter into the reaction, for instance, in the case of diethylamine. In that case products are formed which have the probable formula

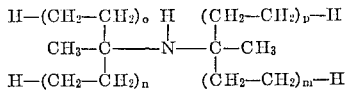

wherein $m$, $n$, $o$ and $p$ are whole numbers.

The structure of the reaction products becomes even more branched when the starting amines comprise a still greater number of reactive hydrogen atoms, such as triethylamine and diethylenetriamine.

The liquid amines with a relatively low molecular weight of up to about 500 which are obtained in accordance with the present invention are useful as wetting and emulsifying agents in aqueous solutions at acid pH values. Moreover, by ethoxylation or by alkylation with alkylating agents having solubilizing groups they may be transformed into useful surfactive compounds.

The telomerization products with a relatively medium molecular weight of about 500 to 2000 are useful as lubricating oil additives. Some of them exhibit corrosive-inhibiting properties.

The wax-like to solid polyethylenes comprising amino groups obtained pursuant to the present invention, that is, those with a molecular weight of about 1000 to 6000, preferably 2000 to 4000, are readily emulsifiable in water with the aid of various wetting agents. In distinction over previously known emulsifiable polyethylenes, they are characterized in that they are odorless. Their emulsions are generally very stable.

The products according to the present invention are also compatible with other commercially available types of polyethylene and carnauba wax in the molten as well as solid state and also with emulsions of such substances.

The following examples illustrate the present invention and will enable others skilled in the art to understand it more completely. It should be understood, however, that the invention is not limited to the particular examples given below and that other known expedients such as employment of other free-radical polymerization catalysts may be employed.

Example I 27.8 g. (0.47 mol) of isopropylamine and 1 g. (7 millimols) of di-tert.-butyl peroxide were placed into an autoclave having a capacity of 1 liter. The autoclave was closed, heated to 100° C. and then ethylene was introduced under pressure until the internal pressure in the autoclave had reached 195 atmospheres gauge. By weighing the autoclave before and after the introduction of ethylene it was determined that about 300 g. of ethylene (11 mols) were introduced. Thereafter, the contents of the autoclave were slowly heated to 200° C. over a period of two hours, during which time a maximum pressure of 300 atmospheres developed in the autoclave. Thereafter, the contents of the autoclave were maintained at 200° C. for two hours more, during which time the internal pressure dropped to 200 atmospheres. The autoclave was then allowed to cool and the unreacted ethylene was exhausted therefrom. 125 g. of a solid, colorless substance remained as a residue in the autoclave. The residue was dried in vacuo for 20 hours and yielded 114 g. of nitrogen-containing polyethylene. The dried product was three times dissolved in benzene and each time reprecipitated therefrom with ethanol. Thereafter, the purified product was dried in vacuo, yielding a solid polyethylene product having a nitrogen content of 0.3% by weight and a melting range of 80 to 93° C.

Example II

Example I was repeated, but the amount of di-tert.-butyl peroxide in the reaction mixture was varied. The amount of di-tert.-butyl peroxide used in each run and the amount and physical data of the nitrogen-containing polyethylene product obtained are shown in the following table:

TABLE I

| Run No. | Di-tert.-butyl peroxide used | | Amount of nitrogen-containing polyethylene obtained, g. | Nitrogen Content, Percent | Melting Range, ° C. |
|---|---|---|---|---|---|
| | Gram | Millimol/mol isopropylamine | | | |
| 1 | 1.0 | 14 | 114 | 0.30 | 80–93 |
| 2 | 0.5 | 8 | 70 | 0.35 | 85–95 |
| 3 | 0.25 | 4 | 65 | 0.28 | 80–90 |
| 4 | 0.13 | 2 | 42 | 0.29 | 82–90 |
| 5 | 0.07 | 1 | 5 | 0.27 | 82–95 |

This example demonstrates that the amount of solid polyethylene having a nitrogen content decreases with a decreasing concentration of free-radicals present in the reaction mixture. The telomer produced however has approximately the same molecular weight as shown by the nitrogen content.

Example III

Example I was repeated, but with the variation that, instead of di-tert.-butyl peroxide as initiator, varying amounts of azo-di-isobutyric acid nitrile was used as follows:

(a) 1.0 g. corresponding to about 6 millimol and
(b) 0.5 g. corresponding to about 3 millimol.

The yield amounted to (a) 80 g. of polyethylene (nitrogen content=0.29%, with a melting range of 82–90° C.);
(b) 56 g. of polyethylene (nitrogen content=0.28%, with a melting range of 85–90° C.).

Here, also, the effect of decreasing concentration of free radicals in the telomerization reaction is shown.

Example IV (a) Example I was repeated, but with the variation that only 200 g. of ethylene (about 7 mol) were introduced. A maximum pressure of 200 atmospheres was reached. After the working up procedure, which was performed as described in Example I, 40 g. of polyethylene (nitrogen content 0.32% with a melting range of 85–95° C.) were obtained.

(b) Several experiments were run in an autoclave of a ½ liter capacity. Each time 13.9 g. of isopropylamine were admixed with 0.5 g. of di-tert.-butyl peroxide. Varying amounts of ethylene were added and the reaction mixture was slowly heated to 200° C. over a period of 2 hours. The working up procedure was performed as described in Example I. The results obtained are shown in Table II, following.

TABLE II

| Ethylene pressure (at 200° C.), (atm.) | Yield (in g.) | Melting range (in ° C.) | Nitrogen content (in percent) | Penetration (10⁻¹ mm.) |
|---|---|---|---|---|
| 400 | 30.3 | 90–95 | 0.27 | 10–11 |
| 640 | 43.6 | 92–97 | 0.25 | 4–5 |
| 1,000 | 43.2 | 94–100 | 0.26 | 1.5–2.5 |

This experiment demonstrates the effect of increased pressure of ethylene (ethylene concentration) on the molecular weight of the nitrogen containing polyethylene.

Example V

In an autoclave of 1 liter capacity, ethylene was polymerized in the presence of various amines at a temperature of 200° C. and 1 g. each of di-tert.-butyl peroxide as initiator. The working up procedure was performed as described in Example I. Conditions and results are shown in Table III following. The reaction conditions and the intervals observed corresponded with Example I.

TABLE III

| Amine | Ethylene pressure (at 200° C.), (atm.) | Yield (in g.) | Melting Range (in ° C.) | Nitrogen content (in percent) | Penetration ($10^{-1}$ mm.) |
|---|---|---|---|---|---|
| 29.7 g. butylamine | 290 | 70 | 85–93 | 0.29 | 7–8 |
| 28.3 g. diethylamine | 300 | 95 | 85–95 | 0.23 | 12–13 |
| 29.3 g. triethylamine | 272 | 96 | 85–93 | 0.22 | 21–22 |

Example VI

Into a 3 liter autoclave with electromagnetic agitation, 1320 ml. of isopropylamine were introduced. After being heated to 200° C., the autoclave was supplied with ethylene at 130 atmospheres, and with the aid of a series-connected injection apparatus, a mixture of 4 g. of di-tert.-butyl peroxide and 16 ml. of isopropylamine were injected within few seconds. Directly after this injection of the peroxide, the pressure rose to 135 to 145 atmospheres, while the temperature rose to 205° to 210° C. Within 5 minutes, the pressure dropped then to 70 to 100 atmospheres, while the temperature dropped to 200° C. Next, ethylene was introduced to return the pressure to the starting pressure of 130 atmospheres. Then at intervals of 5 to 7 minutes 4 g. of peroxide, each time dissolved in 16 ml. of isopropylamine, were injected for a total of 8 times. Each time, after the reaction had subsided, ethylene was supplied to 130 atmospheres. At the conclusion of the series of injections, the reaction mixture was agitated at 200° C. for a further period of 1 hour.

Total amount of peroxide: 36 g. (245 millimols).
Total amount of amine: 1016 g. (17.2 mols).

After the excess isopropylamine was distilled from the reaction mixture, the reaction product was fractioned, first at atmospheric pressure then at reduced pressure. Altogether, 439.4 g. of distillate were obtained in nine different boiling point fractions plus the residue. Their characteristic data are given in Table IV following. In the first column, the symbol ($n$) corresponds to that of Formula I as shown in the descriptive text. The other columns contain data for the boiling point, refractive indices, amounts obtained and the found and calculated molecular weights for the compounds of Formula I with different values for $n$. The molecular weight was determined cryoscopically in benzene as well as by titration with perchloric acid. The obtained amines are predominantly novel substances. Their homogeneity was established by gas chromatography.

TABLE IV

| Fraction ($n$) | Boiling Range (° C.) | Mm. of Hg | Refractive Index $n_D^{20}$ | Amount (In grams) | Amount (In percent) | Molecular Weight (Found) | Molecular Weight (Calculated) |
|---|---|---|---|---|---|---|---|
| 1 | 75–80 | 760 | 1.4010 | 125.9 | 28.6 | 92 | 87 |
| 2 | 128–130 | 760 | 1.4163 | 89.1 | 20.3 | 112 | 115 |
| 3 | 173–179 | 760 | 1.4260 | 64.7 | 14.7 | 144 | 143 |
| 4 | 216–220 | 760 | 1.4336 | 43.2 | 9.8 | 172 | 171 |
| 5 | 73–76 | 0.3 | 1.4407 | 26.3 | 6.0 | 196 | 199 |
| 6 | 96–100 | 0.3 | 1.4469 | 18.2 | 4.2 | 221 | 227 |
| 7 | 120–124 | 0.3 | 1.4509 | 14.8 | 3.4 | 250 | 255 |
| 8 | 154–158 | 0.3 | 1.4550 | 11.9 | 2.7 | 277 | 283 |
| 9 | 185–192 | 0.3 | 1.4598 | 4.3 | 1.0 | 308 | 311 |
| >9 | | | | 41.0 | 9.3 | 502 | |
| | | | | 439.4 | 100.0 | | |

The example was repeated with the same equipment, while varying the amount of peroxide injected each time. The proportions are presented in Table V following. To facilitate the summary, the fifth and sixth columns of preceding Table IV have given once more.

TABLE V.—TABLE CONCERNING THE YIELD WITH REFERENCE TO THE AMOUNT OF PEROXIDE UTILIZED

| $n$ | 36 g. (9×4 g.) (Grams) | 36 g. (9×4 g.) (Percent) | 54 g. (9×6 g.) (Grams) | 54 g. (9×6 g.) (Percent) | 72 g. (9×8 g.) (Grams) | 72 g. (9×8 g.) (Percent) |
|---|---|---|---|---|---|---|
| 1 | 125.9 | 28.6 | 307.3 | 41.2 | 233.0 | 32.1 |
| 2 | 89.1 | 20.3 | 156.1 | 20.9 | 150.5 | 20.7 |
| 3 | 64.7 | 14.7 | 95.7 | 12.9 | 127.5 | 17.6 |
| 4 | 43.2 | 9.8 | 62.2 | 8.3 | 67.5 | 9.5 |
| 5 | 26.3 | 6.0 | 37.1 | 5.0 | 41.4 | 5.7 |
| 6 | 18.2 | 4.2 | 30.1 | 4.0 | 24.8 | 3.4 |
| 7 | 14.8 | 3.4 | 16.9 | 2.3 | 19.7 | 2.7 |
| 8 | 11.9 | 2.7 | 8.2 | 1.1 | 15.4 | 2.1 |
| 9 | 4.3 | 1.0 | 2.1 | 0.3 | 5.0 | 0.7 |
| Residue | 41.0 | 9.3 | 30.0 | 4.0 | 40.0 | 5.5 |
| | 439.4 | 100.0 | 745.7 | 100.0 | 724.8 | 100.0 |

Example VII

Example VI was repeated using the same amount of isopropylamine and the same amount (36 g.) of di-tert.-butyl peroxide (4 g. were injected, 9 times). However, the ethylene pressure was varied under the same conditions of processing at 70, 190 and 270 atmospheres. For the purpose of completion, the results of Example VI, Table IV are given again. "$n$" indicates the number of ethylene units in 1 mol of amine as per Formula I.

TABLE VI.—THE YIELD AS A FUNCTION OF PRESSURE

| $n$ | 70 atm. (Grams) | 70 atm. (Percent) | 130 atm. (Grams) | 130 atm. (Percent) | 190 atm. (Grams) | 190 atm. (Percent) | 270 atm. (Grams) | 270 atm. (Percent) |
|---|---|---|---|---|---|---|---|---|
| 1 | 113.3 | 51.3 | 125.9 | 28.6 | 151.0 | 24.1 | 151.5 | 22.1 |
| 2 | 50.5 | 22.8 | 89.1 | 20.3 | 117.6 | 18.7 | 117.0 | 16.9 |
| 3 | 21.3 | 9.7 | 64.7 | 14.7 | 92.0 | 14.7 | 86.9 | 12.6 |
| 4 | 10.2 | 4.6 | 43.2 | 9.8 | 70.9 | 11.3 | 85.7 | 12.4 |
| 5 | 6.4 | 2.6 | 26.3 | 6.0 | 45.0 | 7.2 | 53.2 | 7.7 |
| 6 | | | 18.2 | 4.2 | 36.6 | 5.8 | 44.8 | 6.5 |
| 7 | | | 14.8 | 3.4 | 29.4 | 4.7 | 37.6 | 5.4 |
| 8 | | | 11.9 | 2.7 | 20.3 | 3.2 | 26.8 | 3.9 |
| 9 | | | 4.3 | 1.0 | 13.7 | 2.2 | 18.7 | 2.7 |
| Residue | 20.0 | 9.0 | 41.0 | 9.3 | 51.0 | 8.1 | 68.0 | 9.8 |
| | 221.7 | 100.0 | 439.4 | 100.0 | 627.5 | 100.0 | 690.2 | 100.0 |

Example VIII

This example was performed with the same equipment and in the same manner as in Example VI. Instead of isopropylamine, altogether 1060 g. of secondary butylamine were used. Ethylene pressure and the amount of di-tert.-butyl peroxide (9×4 g.=36 g.) were the same as in example VI. In Table VII following, the products obtained after being worked up by fractional distillation, are characterized. The first column indicates the number of mols of ethylene to one mol of amine, the other columns give the characteristic data of the fractions obtained.

after the first injection of the peroxide, to 120 atmospheres. Before the injection of the further portions of TABLE VII.—SHOWING THE PRODUCTS FROM THE REACTION OF ETHYLENE AND SECONDARY BUTYLAMINE

| Fraction (n) | Boiling Range (°C.) | Mm. of Hg | Refractive Index $n_D^{20}$ | Amount (In grams) | Amount (In percent) | Molecular Weight (Found) | Molecular Weight (Calculated) |
|---|---|---|---|---|---|---|---|
| 1 | 109–110 | 760 | 1.4151 | 110.2 | 21.0 | 102 | 101 |
| 2 | 155–158 | 760 | 1.4260 | 99.2 | 18.9 | 129 | 129 |
| 3 | 200–202 | 760 | 1.4347 | 78.2 | 14.9 | 155 | 157 |
| 4 | 240–245 | 760 | 1.4415 | 59.5 | 11.3 | 189 | 185 |
| 5 | 82–85 | 0.25 | 1.4460 | 44.2 | 8.4 | 218 | 213 |
| 6 | 117–120 | 0.25 | 1.4502 | 33.6 | 6.4 | 240 | 241 |
| 7 | 155–160 | 0.25 | 1.4544 | 21.8 | 4.2 | 280 | 269 |
| 8 | 190–195 | 0.25 | 1.4590 | 18.2 | 3.5 | 290 | 297 |
| >8 | | | | 60.1 | 11.4 | 620 | |
| | | | | 525.0 | 100.0 | | |

Example IX

The reaction was conducted with the same equipment and in the same manner as described in Example VI. 1205 g. of cyclohexylamine and 36 g. of di-tert.-butyl peroxide were used. The ethylene pressure amounted to 120–130 atmospheres, at a temperature of 200–210° C. Upon working up the starting mixture, according to Example VI, 352.0 g. of telomerizate were obtained. By fractional distillation, five different fractions were obtained from this telomerizate.

In Table VIII following, $n$ indicates the number of ethylene units from 1 to 5 according to Formula II of the descriptive text. In all other respects the table conforms to that of Table IV in Example VI. The products produced by the reaction are novel substances, whose homogeneity was determined by gas chromatography.

TABLE VIII

| Fraction (n) | Boiling Range (°C.) | Mm. of Hg | Refractive Index $n_D^{20}$ | Amount (In grams) | Amount (In percent) | Molecular Weight (Found) | Molecular Weight (Calculated) |
|---|---|---|---|---|---|---|---|
| 1 | 170–176 | 760 | 1.4608 | 106.2 | 30.2 | 126 | 127 |
| 2 | 208–212 | 760 | 1.4617 | 64.8 | 18.4 | 148 | 155 |
| 3 | 62–68 | 0.1 | 1.4642 | 45.8 | 13.0 | 177 | 183 |
| 4 | 86–89 | 0.1 | 1.4665 | 22.0 | 6.3 | 211 | 211 |
| 5 | 102–105 | 0.1 | 1.4687 | 8.8 | 2.5 | 235 | 239 |
| >5 | | | | 104.4 | 29.6 | 480 | |
| | | | | 352.0 | 100.0 | | |

Example X

The reaction was conducted in the same equipment and in the same manner as described in Example VI. 1500 g. of diethylamine and 36 g. of di-tert.-butyl peroxide were used. The ethylene pressure was raised from 100 atmospheres to 140 atmospheres after each injection of peroxide dissolved in amine, at a temperature of 220° C.

For the purpose of working up, the excess amine was distilled. The residue was taken up in about twice its amount of ether and the solution was then saturated with hydrogen chloride while cooling. The previously homogeneous mixture separated into two layers. The lower layer was repeatedly extracted with ether, then dissolved in water and made alkaline with 40% aqueous sodium hydroxide while cooling. This solution was then extracted under agitation with ether, and the ethereal extracts were dried over sodium sulfate. The ether was removed by distillation, and the residue was dried over caustic soda.

By the fractionated distillation, altogether 322 g. of product were obtained, of which about 90% boiled at a range from 55° C. (at 760 mm. of Hg) to 150° C. (at 0.25 mm. of Hg). The molecular weight varied from 140 to 353.

Example XI

The reaction was performed with the same equipment and in the same manner as in Example VI. 1500 g. of triethylamine and 36 g. of di-tert.-butyl peroxide were used in 9 portions of 4 g. each. The ethylene pressure dropped, peroxide, the pressure was increased to 150 atmospheres. The temperature was maintained at 220° C.

After the working up procedure, as described in Example VIII, products were obtained by fractional distillation, which had a boiling point between 87° C. (760 mm. of Hg) to 155° C. (0.2 mm. of Hg). The molecular weight of the fractions increased continuously from 175 to 339.

Example XII 50 g. of polyethylene, containing free amino groups, of a melting range of 92° C. to 97° C. and a nitrogen content of 0.25%, were melted and then 10 g. each of olein and morpholine were added while being stirred. The mixture was poured, within about 3 minutes, into 230 cc. of water heated to 95° C. A stable emulsion was obtained, which, when applied on lacquered metal surfaces, produced solid coatings of a dull luster, these coatings being strongly water-repellent.

The preceding specific embodiments are illustrative of the invention. It will be understood however that other expedients known to those skilled in the art may be employed without departing from the spirit of the invention or the scope of the appended claims.

We claim:

1. A process for the preparation of predominately solid telomers of ethylene with amines which comprises reacting at least 5 mols of ethylene with one mol of an amine containing only nitrogen, carbon and hydrogen, having at least one

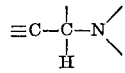

group and having at least one hydrogen on the carbon atoms alpha to the amino group, said amine being free of acetylenic bonds and olefinic unsaturation and having from two to twenty carbon atoms, in the presence of a free-radical polymerization catalyst which does not decompose at room temperature, at temperatures of from about 50° C. to about 300° C. at an ethylene pressure of at least 150 atmospheres, and recovering said predominately solid telomers.

2. A process for the production of predominately solid telomers of ethylene with amines which comprises the steps of mixing at least 5 mols of ethylene with one mol of an amine containing only nitrogen, carbon and hydrogen, having at least one

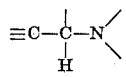

group whose carbon atom alpha to the amino group has at least one hydrogen atom, said amine being free of acetylenic bonds and olefinic unsaturation and having from two to twenty carbon atoms, in the presence of from 10 to 20 millimols per mol of amine of a free-radical polymerization catalyst which does not decompose at room temperature, slowly, over a period of at least one hour, heating said mixture to a final temperature of 200° C. at a final ethylene pressure of at least 150 atmospheres and recovering said predominately solid telomers.

3. The process of claim 2 wherein said polymerization catalyst is di-tert.-butyl peroxide.

4. The process of claim 2 wherein said polymerization catalyst is azo-di-isobutyric acid nitrile.

5. A process for the preparation of predominately distillable liquid telomers of ethylene with amines which comprises mixing less than 5 mols of ethylene with one mol of an amine containing only nitrogen, carbon and hydrogen, having at least one

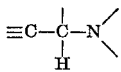

group and having at least one hydrogen on the carbon atoms alpha to the amino group, said amine being free of acetylenic bonds and olefinic unsaturation and having from two to twenty carbon atoms, heating the mixture to a temperature of from about 50° C. to about 300° C. at an ethylene pressure of from 30 atmospheres to 300 atmospheres, adding sufficient free-radical polymerization catalyst which decomposes at said temperatures to effect polymerization to said heated mixture, cooling and recovering said predominately distillable liquid telomers.

6. The predominately solid telomers produced by the process of claim 1.

References Cited

UNITED STATES PATENTS

| | | | |
|---|---|---|---|
| 3,257,364 | 6/1966 | Eberhardt | 260—88.2 |
| 3,275,611 | 9/1966 | Mottus et al. | 260—94.9 |
| 3,275,615 | 9/1966 | Krulisch | 260—94.9 |
| 3,280,095 | 10/1966 | Lyon | 260—94.9 |
| 3,328,379 | 6/1967 | Grosmangin | 260—94.9 |
| 2,566,538 | 9/1951 | Schmerling | 260—94.9 |
| 2,772,271 | 11/1956 | Urry | 260—326.8 |
| 3,115,468 | 12/1963 | Emrick et al. | 260—94.9 |
| 3,020,288 | 2/1962 | Wragg et al. | 260—326.8 |

OTHER REFERENCES

Hirota et al., Nippon, Hoshasen, Kobunshi, Kenkyn, Kyokai Nempo, 4, 235–237, 1962. English translation, pp. 319–322 relied on.

JOSEPH L. SCHOFER, *Primary Examiner.*

M. B. KURTZMAN, *Assistant Examiner.*